United States Patent Office 3,275,464
Patented Sept. 27, 1966

3,275,464
YELLOW PIGMENT AND METHOD OF
PREPARATION
Erich Tanke, Bensheim-Auerbach, Germany, assignor to Vereinigte Ultramarinfabriken Aktiengesellschaft vormals Leverkus, Zeltner & Consorten, Cologne, Germany
No Drawing. Filed July 15, 1963, Ser. No. 295,237
Claims priority, application Germany, July 17, 1962, V 22,795
4 Claims. (Cl. 106—288)

This invention relates to a yellow pigment and its method of preparation.

The new pigment is prepared by heating kaolin with a compound containing the group SCN or SeCN, such as thiourea, a rhodanide of the first and second group of the periodic system, or the corresponding selenium compounds, for several hours at a temperature of 180 to 210° C. until an intensely yellow colored mass has been formed. The heating time in a covered crucible is generally 3 to 7, preferably 4 to 5 hours.

Suitable rhodanides or corresponding selenium compounds are, for instance, $Mg(SCN)_2$, $Ca(SCN)_2$, $NH_4SCN$, $KSCN$, and others. They are used in amounts of 4 to 20, preferably about 10 to 15 percent by weight of the kaolin, depending on the desired shade. Smaller or larger amounts generally produce weaker shades. Further addition of polysulfides such as $Na_2S_4$, $K_2S_x$ and/or thiosulfates such as $Na_2S_2O_3$, $K_2S_2O_3$ and the like generally produces deeper shades. These compounds may be added in any amounts up to 20 percent of the kaolin, whereby the total amount of additives should not exceed about 30 percent by weight of the kaolin.

The shade can also be modified by the origin and selection of the kaolin. For instance, English kaolins produce greenish shades and kaolin of Milos type G a light yellow.

The coloring power of the new yellow pigments depends on the grain size of the kaolin used. The finer the grain, the better is the coloring power. By washing, the color of the pigment becomes considerably more brilliant.

As no fritting of the mass takes place at the temperature of preparation, no subsequent grinding of the pigment is required.

The obtained pigments are heat resistant up to 210° C. They are also resistant against acids, alkalies, and cement. As they are free of heavy metals, they are non-toxic.

The new pigments have many uses, and they are suitable for incorporation in plastics such as polyvinyl chloride, and rubber to which they do not only impact color but may also act as sulfur transfer agents in the vulcanization. By combination with ultramarin, various green shades may be produced, for instance Russian green, Lind green, and the like.

As inorganic pigments, the new yellow pigments may be compared to nickel-titanium-yellow and chrome yellow (lead chromate). Compared with nickel-titanium-yellow, they give a considerably stronger color and are cheaper to manufacture, and they are heat resistant at higher temperatures than chrome yellow. They have the advantage over both known pigments that they do not contain heavy metals and are non-toxic.

The following examples are given to illustrate the invention. All parts are given by weight. The obtained end products were always washed with water, filtered, and dried at 105° C.

Example 1

A mixture of 100 parts of kaolin and 15 parts of thiourea was heated for 5 hours at 190° C.
Color: Light lemon yellow.

Example 2

A mixture of 100 parts of kaolin, 15 parts of thiourea and 15 parts of $Na_2S_2O_3$ was heated for 5 hours at 190° C.
Color: Gold
The same results were obtained when $Na_2S_4$ or $K_2S_x$ were used instead of the $Na_2S_2O_3$.

Example 3

A mixture of 100 parts of Schnaittenbach kaolin, 10 parts of thiourea, and 10 parts of $K_2S_x$ were heated for 5 hours at 190° C.
Color: Gold Example 4

A mixture of 100 parts of Schnaittenbach kaolin and 15 parts of $Mg(SCN)_2 \cdot 4H_2O$ was heated for 5 hours at 190° C.
Color: Light yellow.
The same result was obtained with $Ca(SCN)_2 \cdot 3H_2O$.

Example 5

A mixture of 100 parts of Schnaittenbach kaolin and 15 parts of $(NH)_4SeCN$ was heated for 5 hours at 190° C.
Color: Orange.

Example 6

A mixture of 100 parts of Schnaittenbach kaolin and 10 parts of thiourea, and 10 parts of $Na_2S_2O_3$ was heated for 4 hours at 190° C.
Color: Medium yellow.

I claim:
1. A method for preparing an inorganic yellow pigment comprising heating 100 parts of kaolin with about 4 to 20 parts of a compound containing a member of the group consisting of SCN and SeCN and selected from the class consisting of thiourea, ammonium rhodanide, alkali metal rhodanides, alkaline earth metal rhodanides, and the corresponding selenium compounds, for a period of about 3 to 7 hours at a temperature of about 180 to 210° C.
2. The method as claimed in claim 1 wherein the obtained product is cooled, washed with water, and dried.
3. The method as claimed in claim 1 wherein at least one member of the group consisting of alkali metal polysulfides and alkali metal thiosulfates is added to the mixture to be heated.
4. A yellow pigment prepared by the method of claim 1.

References Cited by the Examiner
UNITED STATES PATENTS
2,187,130   1/1940   Lightbody.

TOBIAS E. LEVOW, Primary Examiner.
J. POER, S. E. MOTT, Assistant Examiners.